(12) United States Patent
Busch et al.

(10) Patent No.: US 8,040,352 B2
(45) Date of Patent: Oct. 18, 2011

(54) ADAPTIVE IMAGE INTERPOLATION FOR VOLUME RENDERING

(75) Inventors: Marc Busch, Aachen (DE); Gundolf Kiefer, Aachen (DE); Jürgen Weese, Aachen (DE)

(73) Assignee: Konninklijke Philips Electronics, N.V., Eindhoven (NL)

( * ) Notice: Subject to any disclaimer, the term of this patent is extended or adjusted under 35 U.S.C. 154(b) by 820 days.

(21) Appl. No.: 10/559,050

(22) PCT Filed: May 26, 2004

(86) PCT No.: PCT/IB2004/050780
§ 371 (c)(1),
(2), (4) Date: Dec. 1, 2005

(87) PCT Pub. No.: WO2004/109600
PCT Pub. Date: Dec. 16, 2004

(65) Prior Publication Data
US 2006/0139361 A1    Jun. 29, 2006

(30) Foreign Application Priority Data
Jun. 5, 2003 (EP) .................................... 03101644

(51) Int. Cl.
G06T 15/10  (2006.01)
G06T 15/20  (2006.01)
G06T 17/00  (2006.01)
G06T 15/50  (2006.01)
(52) U.S. Cl. .................. 345/427; 345/424; 345/426
(58) Field of Classification Search .................. 345/424, 345/426–427
See application file for complete search history.

(56) References Cited

U.S. PATENT DOCUMENTS

| 5,966,134 | A | * | 10/1999 | Arias | 345/589 |
| 6,028,608 | A | * | 2/2000 | Jenkins | 345/619 |
| 6,111,582 | A | * | 8/2000 | Jenkins | 345/421 |
| 6,674,430 | B1 | * | 1/2004 | Kaufman et al. | 345/419 |
| 6,747,642 | B1 | * | 6/2004 | Yasumoto | 345/419 |
| 2002/0133321 | A1 | * | 9/2002 | Perry et al. | 703/2 |

FOREIGN PATENT DOCUMENTS
WO    WO0033257 A    6/2000

OTHER PUBLICATIONS

Painter, James; Sloan, Kenneth; "Antialiased Ray Tracing by Adaptive Progressive Refinement;" Jul. 1989; ACM Computer Graphics; vol. 23, No. 3; pp. 281-288.*
Mitchell, Don P.; "Generating Antialiased Images at Low Sampling Densities;" Jul. 1987, SIGGRAPH '87, pp. 65-72.*
Abrash, Michael; "Graphics Programming Black Book Special Edition;" 1997; Coriolis Group, pp. 1133-1144.*
Takaaki Akimoto; Pixel-Selected Ray Tracing; vol. 11, No. 4, Jul. 1991; pp. 14-22; IEEE Inc. New York US.
Phong, Bui-Tuong; Illumination for Computer Generated Pictures; Communication of the ACM, vol. 18, No. 6, pp. 311-317 Jun. 1975.
Marc Levoy; Display of Surfaces From Volume Data; IEEE Computer Graphics and Application; vol. 8, No. 5, pp. 29-37, May 1988.

* cited by examiner

Primary Examiner — Daniel Hajnik

(57) ABSTRACT

Sampling frequency of a ray casting for generating a projection image is varied in dependence of information derived from a 3D volume data during rendering. Furthermore, an interpolation is performed for skipped pixels for which no ray casting was performed in the projection image, based on this information.

6 Claims, 4 Drawing Sheets

ADAPTIVE IMAGE INTERPOLATION FOR VOLUME RENDERING

The present invention relates to the field of digital imaging, in particular where volume rendering is used for the visualization of three-dimensional data. In particular, the present invention relates to a method for rendering a three-dimensional volume dataset, to image processing devices for rendering three-dimensional volume datasets and to computer programs for rendering three-dimensional volume datasets.

Volume rendering is a technique for visualizing sampled functions of three spatial dimensions by computing 2D projections of a semi-transparent volume. Volume rendering projects a volume dataset onto a two-dimensional (2D) image plane or frame buffer. Volume rendering can be used to view and analyze three-dimensional (3D) data from various disciplines, such as biomedicine, geophysics, computational fluid dynamics, finite element models and computerized chemistry. Volume rendering is also useful in the application of 3D graphics, such as virtual reality (VR), computer aided design (CAD), computer games, computer graphics, special effects and the like. The various applications, however, may use a variety of terms, such as 3D datasets, 3D images, volume images, stacks of 2D images and the like, to describe volume datasets.

Because of the increasing size of images, for example, in the medical domain, an interactive rendering speed at a high display quality continues to be a challenging task, even though computational performance of computers is increasing.

In order to facilitate interactive visualization applications, images with a reduced resolution may be generated and scaled to the desired high resolution afterwards. However, this results in a reduced imaging quality, since small details may appear blurred or distorted.

It is an object of the present invention to provide for an improved rendering speed.

According to an exemplary embodiment of the present invention, the above object may be solved by a method for rendering a three-dimensional volume dataset, wherein a sampling frequency in a projection image is varied in dependence on information derived from the three-dimensional volume dataset. According to an aspect of the present invention, this information is derived from the three-dimensional volume dataset during the rendering.

In other words, according to this exemplary embodiment of the present invention, a variation of the sampling in the projection image is based on information derived from the three-dimensional volume datasets during rendering.

Advantageously, according to this exemplary embodiment of the present invention, an interactive visualization at a high speed is facilitated, while maintaining a high image quality. Compared, for example, with an image up-sampling, this exemplary embodiment of the present invention may lead to an improved image quality with no or only negligible performance loss. Compared to a rendering at full resolution, this exemplary embodiment of the present invention may facilitate speed-ups by a factor of 3 (for up-sampling by a factor of 2 in each dimension; larger speed-ups for higher up-sampling factors). However, since the speed-up may vary with the respective hardware, different speed-up factors may be achieved.

According to other exemplary embodiments of the present invention, the rendering includes a ray casting, which involves the computation or determination of depth values and light reflection angles. According to an aspect of the present invention, the sampling frequency in the projection image is varied to at least one of a depth value, surface normal, viewing direction and light vector.

According to these exemplary embodiments of the present invention, a ray casting is used to generate, i.e. the projection image with reduced resolution. In dependence of the depth values and light reflection angles determined during the ray casting, areas of the projection image showing details are identified and the sampling frequency is increased for these areas, i.e. additional rays are cast to increase the resolution in these areas.

According to another exemplary embodiment of the present invention, the variation of the sampling frequency is increased in case a difference between angles between viewing vectors and a surface normal of a pair of pixels in the projection image exceeds a first predetermined threshold, a difference of depth values of a pair of pixels in the projection image exceeds a second predetermined threshold or a depth value of a pixel in the projection image exceeds a predetermined threshold. According to this exemplary embodiment of the present invention, a very fast and efficient method is provided for identifying areas of the projection image, where the sampling frequency has to be increased and additional rays are to be cast to increase the resolution in areas where a low sampling frequency is insufficient or areas where the sampling frequency may even be reduced.

According to other exemplary embodiments of the present invention, a ray casting is performed only for each second, third, fourth etc. pixel of the projection image. According to an aspect of these exemplary embodiments of the present invention, pixels in the projection image for which no ray casting has been performed, are interpolated on the basis of the information derived from the three-dimensional dataset during the rendering, such as, for example, depth values and light reflection angles of neighboring pixels for which a ray casting has been performed. In other words, according to these exemplary embodiments of the present invention, in areas where no additional ray casting has been performed, such that there are pixels in the projection image for which no image information has been obtained, depth values and light reflection angles of surrounding pixels are interpolated and a pixel shading is applied to generate the missing pixel, i.e. to determine the missing pixel information.

Advantageously, due to the interpolation based on the information derived during the rendering, in particular the ray casting, an improved final image may be provided, without blurs or distortions.

According to another exemplary embodiment of the present invention, a method is provided, wherein a projection image generated during the rendering has a first number of pixels. According to an aspect of the present invention, a ray casting is performed for a second number of pixels, wherein the second number is smaller than the first number. To allow for an improved image quality, while reducing the computational efforts necessary to display the three spatial dimensions in the final 212 projection, pixels, for which no ray casting has been performed, are interpolated on the basis of information derived from the three-dimensional volume dataset during ray casting. According to the exemplary embodiment of the present invention, this information corresponds to at least one of depth values and light reflection angles.

According to this exemplary embodiment of the present invention, an interactive visualization at high speed is facilitated. Furthermore, images may be computed in a very short time, which have an improved quality compared with, for example, image up-sampling. Compared to rendering at full resolution, the above exemplary embodiment of the present invention may allow for a significant speed-up by factors of at least 3 or more, while maintaining a very good image quality.

According to other exemplary embodiments of the present invention, image processing devices are provided, each including a memory and a processor. According to an aspect of the present invention, these image processing devices are adapted to perform the methods according to the present invention. According to these exemplary embodiments of the present invention, image processing devices are provided, which allow for a very fast visualizing of sampled functions of three spatial dimensions in 2D projections. Furthermore, due to the reduced amount of calculating steps required, a processor with a reduced calculation power may be used, which allows to significantly reduce the costs of the image processing devices according to the present invention.

According to other exemplary embodiments of the present invention, computer programs are provided, causing a processor to perform an operation when the computer program is executed on the processors, corresponding to the methods according to the present invention. These computer programs may be written in any suitable programming language, for example, C++ and may, for example, be stored on a computer readable medium, such as a CD-ROM. Also, these computer programs may be available from a network, such as the WorldWideWeb, from which they may be downloaded to image processing units or processors, or any suitable computer.

It may be seen as the gist of an exemplary embodiment of the present invention that the sampling of the projection image is varied in dependence of information derived from the three-dimensional volume dataset during rendering. Furthermore, according to an aspect of the present invention, skipped pixels in the projection image are interpolated on the basis of this information derived during rendering. This information may, for example, correspond to at least depth values or light reflection angles.

These and other aspects of the present invention will become apparent from an elucidated with reference to the embodiments described hereinafter.

Exemplary embodiments of the present invention will be described in the following, with reference to the following drawings.

Figure 1:
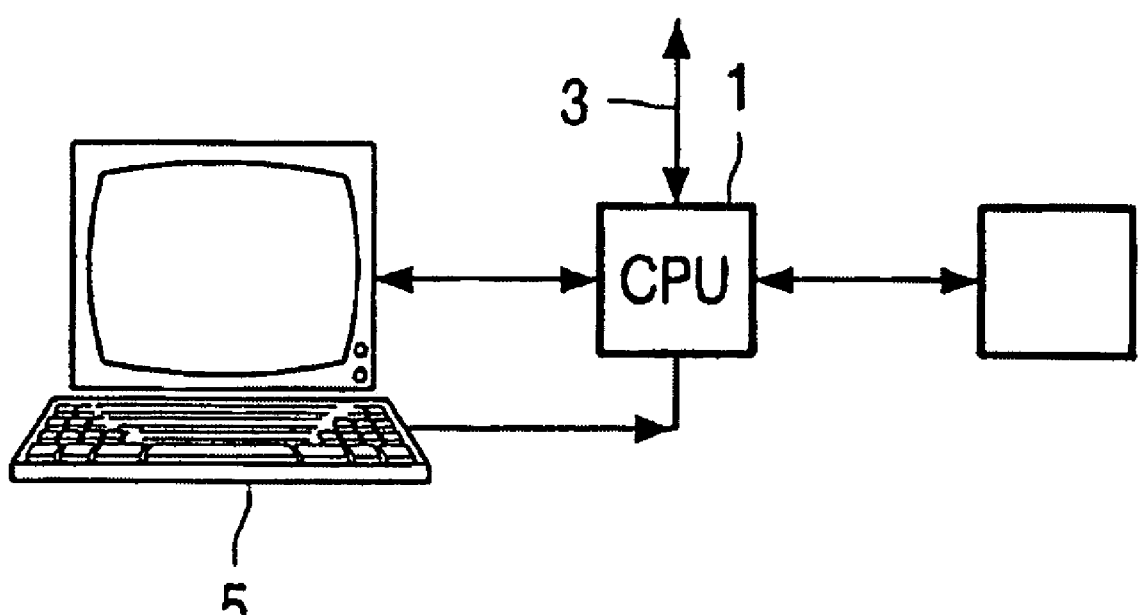
FIG. 1 shows a schematic representation of an image processing device according to an exemplary embodiment of the present invention, adapted to execute an exemplary embodiment of a method according to the present invention.

FIG. 1 shows an exemplary embodiment of an image processing device according to the present invention. The image processing device shown in FIG. 1 includes an image processing and control processor 1 with a memory 9, in which a three-dimensional volume dataset and a projection image generated during rendering may be stored. The image processing and control processor (CPU) 1 may be coupled, via a bus system 3, to an imaging device (not shown in FIG. 1), for example, an MR apparatus, a US (ultrasonic) apparatus, or a CT apparatus. An image generated by the image processing and control processor 1 may be displayed to an operator on a monitor 7, connected to the image processing and control processor 1. The operator may access the image processing and control processor 1 via a keyboard 5 or other input means which are not shown in FIG. 1, such as a mouse or a trackball.

In the following, the present invention will be described with reference to the example of a virtual endoscopy or virtual colonoscopy where movies showing a fly through the colon are generated to provide an easy way of spotting anomalies of the colon wall. However, it has to be noted that the present invention is not limited to this example or to any medical applications, but can be applied and used in any type of application dealing with the visualization of objects or models represented as sample data in three or more dimensions.

Figure 2:
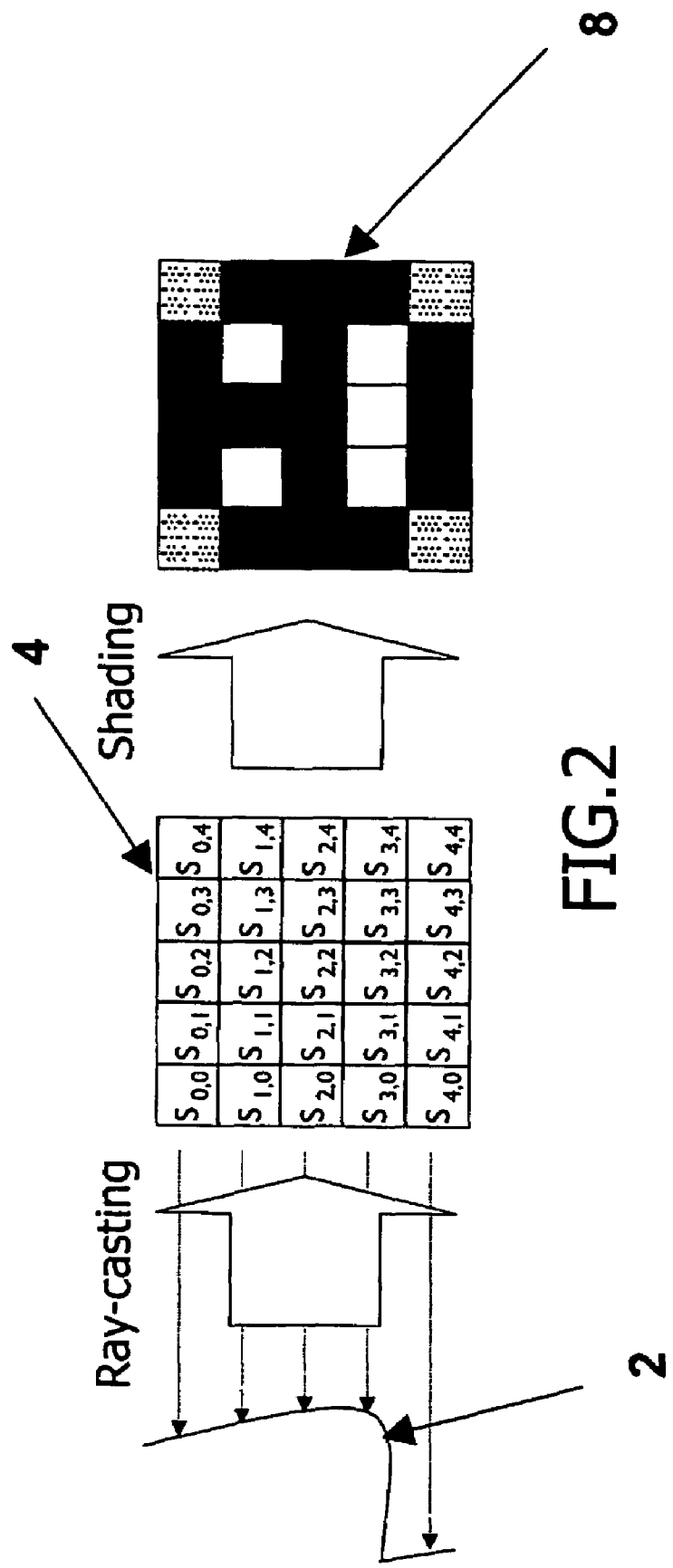
FIG. 2 shows a simplified representation for further explaining an exemplary embodiment of the present invention.

FIG. 2 shows a simplified representation depicting how a 2D image is generated from volume data.

Reference numeral 2 in FIG. 2 designates the three-dimensional volume dataset, i.e. the volume data. As already mentioned above, the volume data may, for example, be acquired by means of an ultrasonic apparatus, CT apparatus or MRI apparatus. However, as also noted above this three-dimensional volume dataset may also be generated by means of a computer and represent computer graphics. In a first step, from the three-dimensional volume dataset 2, intermediate data 4 for representing a projection image is generated. This may be done by ray casting, where a ray casting is performed for each pixel $S_{0,0}$ to $S_{4,4}$ of the projection image in order to calculate a distance from a view point to the corresponding surface point and an angle between a viewing vector and a surface normal at that point.

Such a method is, for example, described in further detail in M. Levoy "Display of Surfaces from Volume Data", IEEE Computer Graphics and Application, Vol. 8, No. 5, pp. 29-37, 1988, which is hereby incorporated by reference.

As may be taken from FIG. 2, each pixel $S_{0,0}$ to $S_{4,4}$ may contain information with respect to at least one of depth values, light reflection angles and the surface normal at that point. Also, information relating to viewing direction and light vector may be included.

Then, in a subsequent step, this intermediate data 4, i.e. the projection image, may be transformed into gray values or color values 8, based on a shading model, to give a realistic impression of the anatomy. A suitable shading model is, for example, known from Phong, Bui-Tuong, "Illumination for Computer-Generated Pictures", Communications of the ACM, Vol. 18, No. 3, pp. 311-317, 1975, which is hereby incorporated by reference.

From a complexity point of view, the ray casting step between the three-dimensional volume dataset 2 and the intermediate data 4, may be the most critical step with respect to the speed, as it involves the processing of large three-dimensional datasets, including tri-linear or tri-cubic interpolation. Furthermore, this step may require costly and irregular memory access. A CPU time required for shading can be neglected in comparison to the CPU time required for ray casting between the three-dimensional volume dataset 2 and the intermediate data 4, as the total amount of data to be processed is one order of magnitude lower, namely two-dimensional instead of three-dimensional.

Figure 3:
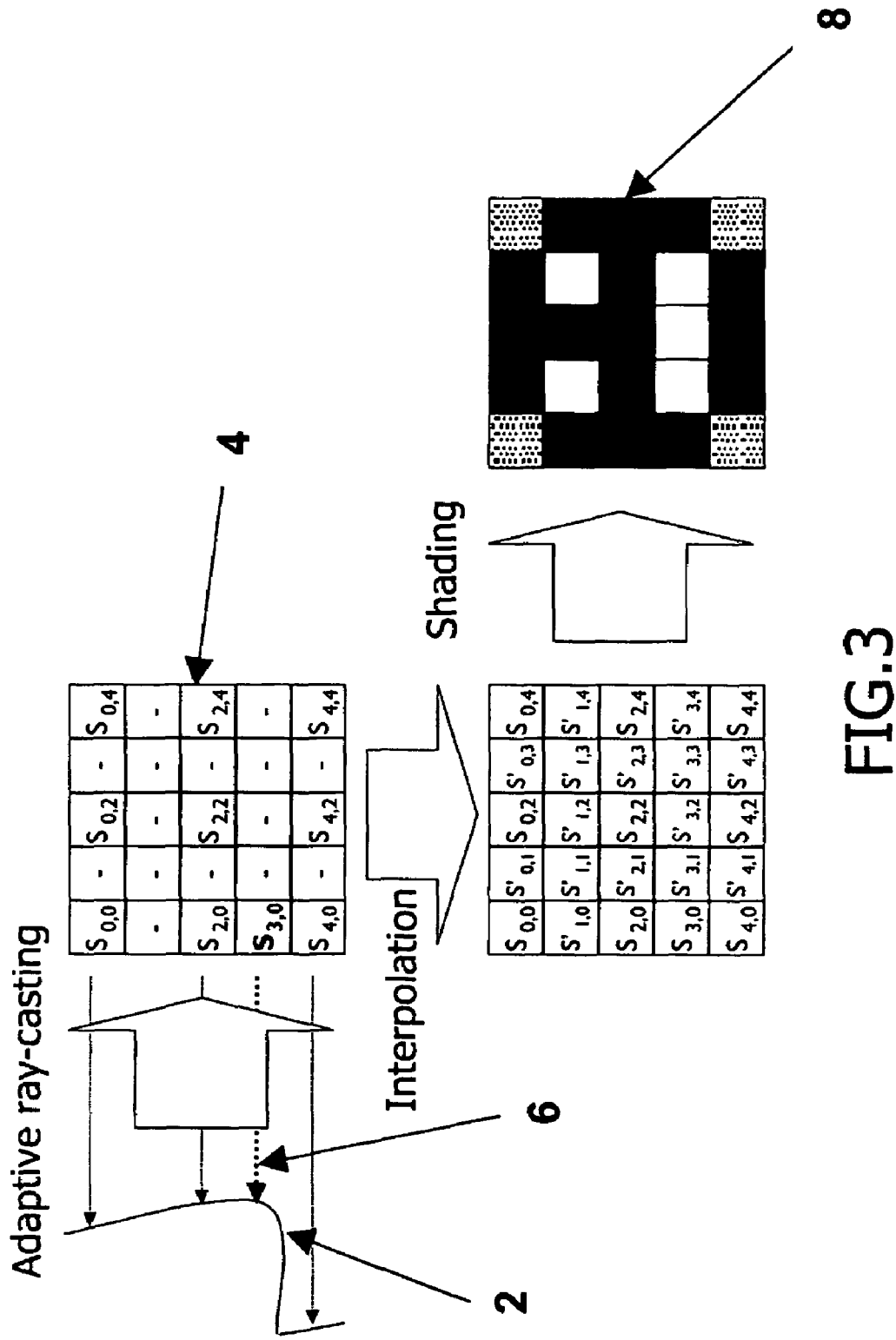
FIG. 3 shows another simplified representation for further explaining an exemplary embodiment of the present invention.

FIG. 3 shows a simplified representation for further explaining a method of operating the image processing device of FIG. 1 in accordance with an exemplary embodiment of the present invention. The method described with reference to FIG. 3 may also be implemented as a computer program written in a suitable programming language, such as, for example, C++. Such a computer program may be stored on a computer readable medium, such as a CD-ROM. Or the computer program may be presented via a network, such as the WorldWideWeb from which it can be downloaded into a memory of a processor, suitable computer or suitable image processing device.

As may be taken from FIG. 3, after the acquisition of the three-dimensional volume dataset 2, an adaptive ray casting is performed to obtain the intermediate data 4, namely the projection image, such a ray casting is, for example, described in M. Levoy "Display of Surfaces from Volume Data", IEEE Computer Graphics and Application, Vol. 8, No. 5, pp. 29-37, 1988, which is hereby incorporated by reference. However, as may be taken from FIG. 3, the ray casting is first performed only for every $n^{th}$ pixel of the projection image, with n ∈ [2; 3; 4; ... ∞[. In the example of FIG. 3, the ray casting is initially only performed for every second pixel of the projection image in both dimensions, i.e. x and y dimensions of the projection image and thus only 25% of the total number of pixel of the projection image. Then, in a subsequent step, according to the present invention, areas of the projection image are determined, where this undersampling would cause a significant loss of image quality. In other words, in this step, areas in the projection image are identified, where a reduced sampling frequency may be accepted and does not cause a deterioration of the image quality and areas where such a reduced sampling or undersampling would cause a significant loss of image quality and thus where an increase of the sampling frequency is required. Areas, where the undersampling would cause a significant loss of image quality are, for example

- areas with high variations of the surface orientation
- areas including edges, for example, at wrinkles of the surface and
- distant areas in the final image, where the surface structures appear small as a result of the perspective projection.

These areas may be identified as follows:

For a given image pixel p of the pixels of the projection images $S_{0,0}$ to $S_{4,4}$, $\alpha_p$ is the angle between the viewing vector and the surface normal, which is also referred to as image gradient. The quantity $z_p$ denotes the depth value of the pixel. Further, $\Delta z_p$ and $\Delta \alpha_p$ are the maximum differences of respective values for neighboring pixels. These values $\alpha_p$, $z_p$, $\Delta \alpha_p$ and $\Delta_p$ can be determined from the results of the ray casting step.

In order to ensure that a subsequent interpolation of the pixel p does not smear out image qualities, i.e. doe not cause blurring or distortions in the final image, the following criteria may be formulated on the basis of which the above areas, where an undersampling would cause a significant loss of image quality may be identified. Also, these criteria ensure that a subsequent interpolation allows a sufficiently good interpolation of the skipped pixel p, for which no ray casting was performed.

According to the first criterion, the sampling frequency is increased in case a difference $\Delta \alpha_p$ of the angles $\alpha_p$ between the viewing factor and the surface normals of a pair of pixels exceed a given limit $\Delta \alpha_{max}$. In other words, the sampling frequency is increased and an additional ray casting is performed for a pixel between a pair of pixels or surrounded by at least two pixels, for which this criterion is fulfilled, i.e. where the difference between the angles between the viewing factor and the surface normal for these two pixels exceeds a threshold value. This criterion can be formulated as $\Delta \alpha_p > \Delta \alpha_{max}$.

The second criterion is based on a difference of depth values of a pair of pixels. According to this criterion, in case the difference of the depth values of a pair of pixels exceeds a given limit or threshold, the sampling frequency for pixels neighboring or in the vicinity of this pair of pixels for which this criterion is fulfilled, is increased and an additional ray casting is performed. This second criterion may be formulated as $$\Delta z_p > \Delta z_{max}.$$

The third criterion is based on the depth value. According to this criterion, the sampling frequency is increased, in case a depth value is larger than a given limit or threshold. In contrast to the first and second criteria, this criterion is formulated for a single pixel and not for pairs of pixels. Mathematically, this criterion can be described by the following equation: $z_p > z_{max}$.

It has to be noted that, instead of relating to pairs of pixels, the above method can easily be extended to 3, 4 or a plurality of pixels.

It has to be noted that the present invention may also be applied to parallel projection. In such a case, the third criterion is not used.

As mentioned above, the initial ray casting in FIG. 3 was only performed for every second pixel in both dimensions. For the remaining pixels, as indicated by the bar in the projection image, no ray casting was performed. Then, after the ray casting with reduced sampling frequency, the above three criteria are checked for the projection image. As may be taken from FIG. 3, for the pixel $S_{3,0}$ one of the above criteria is met. In accordance with the present invention, due to the fact that at least one of the above three criteria was met, the sampling frequency is increased and an additional ray casting, as indicated by the broken line 6, is performed for this pixel $S_{3,0}$. In other words, for $S_{3,0}$, the depth value $z_{3,0}$ and the angle $\alpha_{3,0}$ between the viewing vector and the surface normal, is determined exactly by ray casting.

Then, in a subsequent step, the pixels for which no ray casting was performed, indicated in FIG. 3 by bars in the projection image or immediate data 4, an interpolation is performed. During this interpolation, according to an aspect of the present invention, these pixels $S'_{0,1}$ $S'_{0,3}$ $S'_{1,0}$ $S'_{1,1}$ $S'_{1,2}$ $S'_{1,3}$ $S'_{1,4}$ $S'_{2,1}$ $S'_{2,3}$ $S'_{3,1}$ $S'_{2,1}$ $S'_{3,2}$ $S'_{3,3}$ $S'_{3,4}$ $S'_{4,3}$ and $S'_{4,3}$ are interpolated from information determined during the ray casting. In other words, these pixel values are determined on the basis of at least one of depth values and light reflection angles from the surrounding pixels, for which a ray casting was performed.

After the remaining z and α values for the pixels for which no ray casting was performed have been interpolated, in a subsequent step, a shading is performed at full resolution, in order to generate the final image 8 displayed on the monitor 7 to an operator. A suitable shading method is described, for example, Phong, Bui-Tuong, "Illumination for Computer-Generated Pictures", Communications of the ACM, Vol. 18, No. 3, pp. 311-317, 1975, which is hereby incorporated by reference.

According to the above described method, the sampling in the projection image is varied on the basis of information derived from the three-dimensional volume dataset during the rendering, i.e. the ray casting. Furthermore, according to the present invention, an interpolation of skipped pixels is performed to determine image information for these skipped pixels for which no ray casting was performed. In other words, ray casting is used to generate, for instance, a surface rendering with reduced solution. In dependence of depth values and light reflection angles from the ray casting step, areas showing details are identified and additional rays are cast to increase the resolution. In other areas, depth values and light reflection angles are interpolated and pixel shading is applied to generate missing pixels.

Compared with an image up-sampling, the above described exemplary embodiment of the present invention allows for an improved image quality with no or only negligible performance loss or speed-loss. Compared, for example, to a rendering at full resolution, the above described method may facilitate a speed-up by at least a factor of 3, for example, for an up-sampling by a factor of 2 in each dimension. A larger up-sampling factor naturally causes a higher speed-up. However, also smaller speed-up factors may be achieved.

In the method described with reference to FIG. 3, firstly, all exact pixels of the projection image are determined, and then the criteria are checked, and further pixels are determined by an additional ray-casting. Finally, the interpolation is performed.

According to an aspect of the present invention, these steps are not performed separately one after another, but are performed in combination together for selected (partial) areas/regions of the projection image.

As mentioned above, the sampling frequency may be varied on the basis of at least one of a depth value, surface normal, viewing direction and light vector. According to the preferred embodiment of the present invention, the sampling frequency is varied on the basis of surface gradient vectors, i.e. angles between surface normals and the viewing direction and the depth values.

Figure 4:
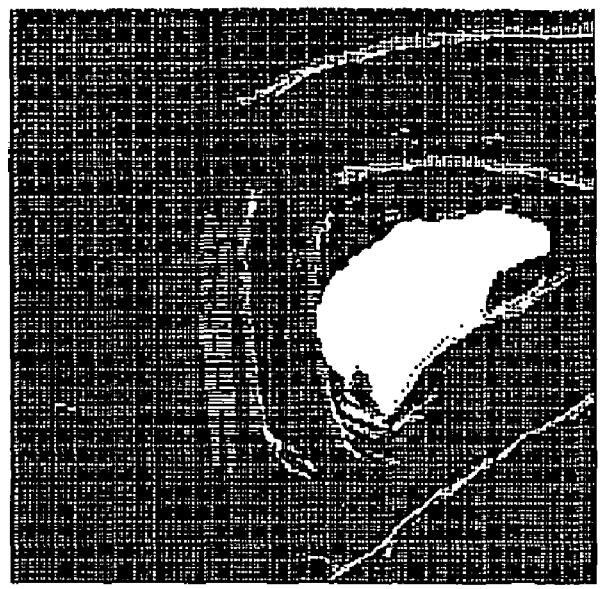
FIG. 4 shows areas where a sampling has been performed with an increased sampling frequency in the Figure of FIG. 5 in accordance with an exemplary embodiment of the present invention.
Figure 5:
FIG. 5 shows an example of an endoscopic image determined in accordance with an exemplary embodiment of the present invention.

FIG. 5 shows an example of an endoscopic image, for which the above described method was applied. FIG. 4 shows the density of exactly computed rays, where the darker regions of FIG. 4 show areas where no increased sampling frequency was used and the lighter areas show areas where an increased sampling frequency has been used. The image size is $300^2$ pixels and, according to the above explained exemplary embodiment of the present invention, the initial ray casting was performed such that every second pixel in each dimension was covered by the ray casting. Thus, a ray casting was performed for 25% of all pixels. Approximately 12% of the remaining pixels did satisfy one of the above three criteria. Thus for this 12% of pixels, an additional ray casting was performed, i.e. the sampling frequency was increased for these pixels. Thus, in comparison to a rendering at full resolution, where ray casting is performed for each pixel, in FIGS. 4 and 5, 63% of the expensive ray casting operation has been eliminated, thus allowing for a significant speed-up of the rendering operation. In the case of FIGS. 4 and 5, this led to a speed-up of a factor of about 3.

As described above, the present invention uses two mechanisms, namely, an adaptive ray casting with a varying sampling frequency, and a data interpolation in the intermediate data 4, i.e. the projection image. According to an aspect of the present invention, both mechanisms need not be used in conjunction. The adaptive sampling may be used in combination with other rendering techniques, such as, for example, the maximum intensity projection (MIP) or the direct volume rendering.

The interpolation of intermediate data may also be used as an alternative to an image-domain reformatting and may provide for a better image quality, because the intermediate image representation contains information, which is lost in the final image.

Also, both mechanisms according to the present invention may be applied to the compression of two-dimensional images and movies generated by renderings from 3D datasets.

The invention claimed is:

1. A method for rendering a three dimensional volume data set, the method comprising the acts of:
   varying, via a processor, a sampling frequency in a projection image in dependence of information derived from the three dimensional volume data set; and
   rendering, via a processor, a resulting image to an output device;
   wherein the information is derived from the three dimensional volume data set during the rendering;
   wherein the sampling frequency is increased when a depth value of a pixel in the projection image exceeds a predetermined threshold; and
   wherein the sampling frequency is increased when a difference between angles between viewing vectors and a surface normal of a pair of pixels in the projection image exceeds a further predetermined threshold.

2. A method for rendering a three dimensional volume data set, wherein a projection image generated during the rendering has a first number of pixels, the method comprising the acts of:
   performing, via a processor, a ray casting for a second number of pixels, wherein the second number is smaller than the first number;
   interpolating, via a processor, pixels of the first number of pixel of the projection image for which no ray casting was performed from information determined during the ray casting; and
   rendering a resulting image to an output device;
   wherein a sampling frequency in the projection image is increased when a depth value of a pixel in the projection image exceeds a predetermined threshold; and
   wherein the sampling frequency is increased when a difference between angles between viewing vectors and a surface normal of a pair of pixels in the projection image exceeds a further predetermined threshold.

3. An image processing device for rendering a three dimensional volume data set, the image processing device comprising:
   a memory for storing the three dimensional volume data set and a projection image generated during rendering; and
   an image processor adapted to vary a sampling frequency in the projection image in dependence of information derived from the three dimensional volume data set;
   wherein the information is derived from the three dimensional volume data set during the rendering;
   wherein the sampling frequency is increased when a depth value of a pixel in the projection image exceeds a predetermined threshold; and
   wherein the sampling frequency is increased when a difference between angles between viewing vectors and a surface normal of a pair of pixels in the projection image exceeds a further predetermined threshold.

4. An image processing device for rendering a three dimensional volume data set, wherein a projection image generated during the rendering has a first number of pixels, the image processing device comprising:
   a memory for storing the three dimensional volume data set and the projection image generated during rendering; and
   an image processor adapted to perform the following operation:
   performing a ray casting for a second number of pixels, wherein the second number is smaller than the first number; and interpolating pixels of the first number of pixels of the projection image for which no ray casting was performed from information determined during the ray casting;

wherein a sampling frequency in the projection image is increased when a depth value of a pixel in the projection image exceeds a predetermined threshold; and wherein the sampling frequency is increased when a difference between angles between viewing vectors and a surface normal of a pair of pixels in the projection image exceeds a further predetermined threshold.

5. A non-transitory computer-readable medium comprising a computer program for rendering a three dimensional volume data set, the computer program being adapted to cause a processor to perform the following operation when the computer program is executed on the processor:

varying a sampling frequency in a projection image in dependence of information derived from the three dimensional volume data set;

wherein the information is derived from the three dimensional volume data set during the rendering;

wherein the sampling frequency is increased when a depth value of a pixel in the projection image exceeds a predetermined threshold; and wherein the sampling frequency is increased when a difference between angles between viewing vectors and a surface normal of a pair of pixels in the projection image exceeds a further predetermined threshold.

6. A non-transitory computer-readable medium comprising a computer program for rendering a three dimensional volume data set, wherein a projection image generated during the rendering has a first number of pixels, the computer program being adapted to cause a processor to perform the following operation when the computer program is executed on the processor:

performing a ray casting for a second number of pixels, wherein the second number is smaller than the first number; and interpolating pixels of the first number of pixels of the projection image for which no ray casting was performed from information determined during the ray casting;

wherein a sampling frequency in the projection image is increased when a depth value of a pixel in the projection image exceeds a predetermined threshold; and wherein the sampling frequency is increased when a difference between angles between viewing vectors and a surface normal of a pair of pixels in the projection image exceeds a further predetermined threshold.

* * * * *